US005586038A

United States Patent [19]
Nagaoka

[11] Patent Number: 5,586,038
[45] Date of Patent: Dec. 17, 1996

[54] MANUFACTURING HISTORY MANAGEMENT SYSTEM

[75] Inventor: Masao Nagaoka, Suzuka, Japan

[73] Assignee: Honda Giken Kogyo Kabushiki Kaisha, Tokyo, Japan

[21] Appl. No.: 174,364

[22] Filed: Dec. 28, 1993

[30] Foreign Application Priority Data

Dec. 28, 1992 [JP] Japan ................................. 4-360453

[51] Int. Cl.$^6$ ............................................. G06F 19/00
[52] U.S. Cl. ............................................. 364/468.01
[58] Field of Search .................................... 364/468, 478,
364/474.11, 184–187, 474.16, 474.18, 131–136, 138, 469

[56] References Cited

U.S. PATENT DOCUMENTS

| | | | |
|---|---|---|---|
| 5,014,208 | 5/1991 | Wolfson | 364/468 |
| 5,077,674 | 12/1991 | Tischler et al. | 364/468 |
| 5,126,932 | 6/1992 | Wolfson et al. | 364/468 |
| 5,166,874 | 11/1992 | Nomaru et al. | 364/184 |
| 5,241,482 | 8/1993 | Iida et al. | 364/468 |
| 5,247,447 | 9/1993 | Korncoff et al. | 364/468 |
| 5,325,582 | 7/1994 | Glaser et al. | 364/468 |
| 5,341,304 | 8/1994 | Sakamoto et al. | 364/468 |

*Primary Examiner*—Roy N. Envall, Jr.
*Assistant Examiner*—Thomas E. Brown
*Attorney, Agent, or Firm*—Dickstein, Shapiro & Morin, L.L.P.

[57] ABSTRACT

Manufacturing history of a product is accumulated without burdening a host computer which manages a production line. Whenever a work or part to be assembled is fed to the production line, a management terminal sets an operation data area corresponding to the work in an operation file. An operation terminal is provided for each step in the production line. These operation terminals each identify a work arriving at a corresponding step station and detect the contents of operation to be carried out on the work. The detected operation contents are written in an operation data area corresponding to the identified work in an operation data area in the operation file.

6 Claims, 6 Drawing Sheets

MANUFACTURING HISTORY MANAGEMENT SYSTEM

BACKGROUND OF THE INVENTION

1. Field of the Invention

This invention relates to a manufacturing history management system which is suitably applicable to a vehicle production line or the like.

2. Description of the Prior Art

FA (factory automation) techniques have brought great results of the product quality improvement, manufacturing cost reduction and productivity improvement to the fields of manufacture. In a production system, in which this kind of FA technology is introduced, the operations of conveying parts to be assembled, control of the assembling and manufacture of the product are all carried out under computer control. More specifically, under the computer control the parts to be assembled are successively conveyed to individual assembling stations, to which control data determined in correspondence to product specifications are supplied. In this way, the desired product is automatically produced without need of cumbersome manual labor. Further, in a process requiring stringent control, the result of operation carried out in each station, for instance the degree of make-up of a bolt, is measured by a sensor or the like, and the result of measurement is checked whether it is coincident with a common setting that is prepared for each product or each part. Only work which has passed the check is fed to the next step. The operations and monitoring thereof are thus effected together for stable production of high quality product.

Meanwhile, the results of monitoring of the contents of operations in the assembling stations in the above production system, although they are often utilized while the product is being manufactured, encounter less occasions to be utilized after the product has been completed and shipped. That is, the results of monitoring have not been managed by taking their utilization efficiency into considerations. Depending on manufactures, however, it is possible in actual practice that information about the history of manufacture of each product becomes necessary after the shipment of the product. For example, a vehicle which has been delivered from a vehicle manufacturer to a purchaser may subsequently get into a trouble. In such a case, it is advantageous in the troubleshooting that there is stored history of the vehicle manufacture, such as the degree of make-up of each bolt in the vehicle. Further, precious technical data for further improving the durability of the vehicle is obtainable by recovering a discarded vehicle, checking the state of each part of the vehicle and collating the result of check with the history of the vehicle manufacture. Thus, for the manufacturer it has been very useful to obtain the history of manufacture of the product. When it is intended to obtain the manufacture history of each product, however, the operation that is performed on each product in each step in the production line has to be monitored at all times. Usually, the production line has many steps. Therefore, if the operation in each of these steps is to be monitored for each product, it dictates enormous burden for the monitoring. If a host computer for controlling the production line also has the role of monitoring the operation content in each step, a considerable portion of its capacity is expended for the monitoring of the operation content, thus resulting in impediment of the effective management of the production line. Heretofore, there has been no effective means for solving this problem, and therefore a system which is effective in view of the above sense has not been realized.

It is an object of the present invention is to provide a manufacturing history management system, which can overcome the above drawback and can collect and manage history of manufacture of products.

SUMMARY OF THE INVENTION

According to the invention, there is provided a manufacturing history management system, which comprises operation control means provided for each manufacturing step in a production line comprising a plurality of manufacturing steps, the operation control means including work identifying means for identifying a work or part to be assembled conveyed along the production line and operation detection means for outputting the result of operation performed on the work in each step, and memory means for preserving the result of operation output in each manufacturing step, the memory means including:
  a file for transmitting and receiving data about the work assembled in the production line;
  an operation data file corresponding to each operation control means and possessing operation data corresponding to the work;
  a checker data file, in which results of operation performed according to operation data in the operation data file is written from the operation detection means through the operation control means; and
  a preservation file for preserving the data in the checker data file after completion of execution of all the steps in the production line;

the manufacturing history management system further comprising management means for controlling data transfer among the individual files in the memory means.

According to an aspect of the invention, in when normal movement from a source to a destination through the individual files in the memory means is completed, the data in the source is deleted by the management means.

According to another aspect of the invention, in a keyword is provided for relating individual table data in the individual files in the memory means.

According to another aspect of the invention, in each working terminal manufacturing history management data sent out from the host computer is displayed on a screen.

MT1 to MT3 ... management terminal, WT ... working terminal, FS1 to FS3 ... file server, 1 ... ALC receiving file, F2 ... ALC transmitting file, F3 ... trigger file, F4 ... operation table, F6 ... checker data file, F7 ... preservation data file, HST ... host computer

DETAILED DESCRIPTION OF THE PREFERRED EMBODIMENT

An embodiment of the invention will now be described with reference to the drawings.

Figure 1:
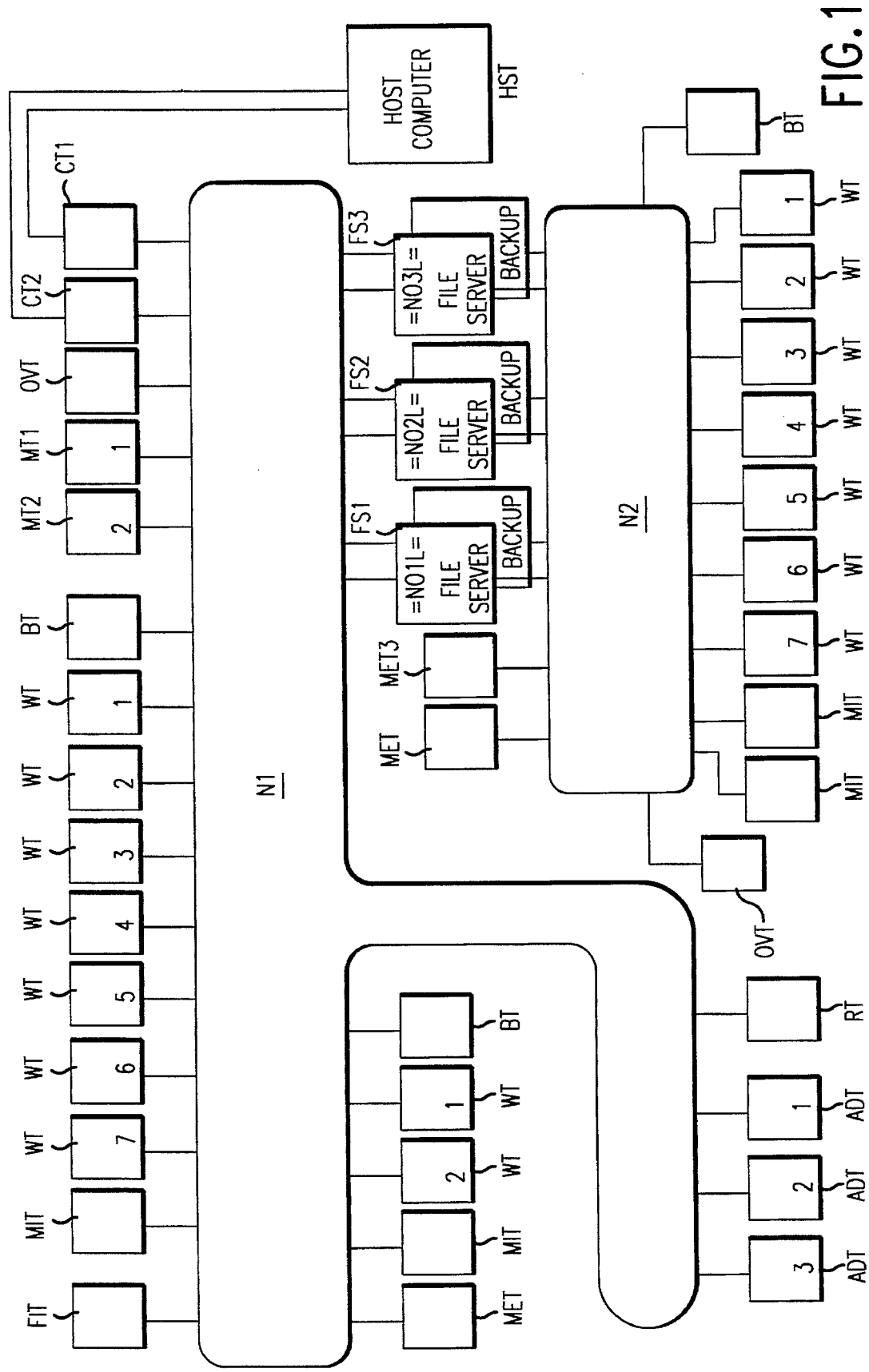
FIG. 1 is a block diagram showing one embodiment of the manufacturing history management system according to the invention.

FIG. 1 is a block diagram showing the structure of an embodiment of the manufacturing history management system according to the invention. This manufacturing history management system is applicable to a SRS (supplemental restraint system) assembling line for assembling the SRS on the vehicle body, and it is installed in a factory along with equipment for carrying out individual operations in the same line.

Before describing the manufacturing history management system, the SRS assembling line will be described. The SRS comprises the following five different parts (not shown in FIG.1).

(1) Dash sensor R (2) Dash sensor L (3) SRS unit (4) Cable reel (5) Module assembly The SRS assembling line has a plurality of steps for carrying out operations of assembling various parts. In each step, basically a single kind of operation is carried out. Each part is prepared for each corresponding step.

To the SRS assembling line, not only vehicles for assembling the SRS thereon (this kind of vehicle being hereinafter referred to as SRS specification vehicle) but also vehicles without need of assembling are fed. The SRS specification vehicles are of various specifications, and the structure of the SRS is different with different specifications. For example, with a vehicle having certain specifications it is necessary to assemble the SRS which includes all the above five parts, while with a vehicle having different specifications some of the parts are unnecessary. In the SRS assembling line, whenever a vehicle arrives at each step station, it is identified, and according to the result of the identification a check is done as to whether a part prepared for the step is to be assembled on the vehicle. Further, the difference of the part prepared from that of the specification is instructed. Under such control, each necessary part is assembled on the vehicle. The specific method of control will be described hereinunder.

To each part, a corresponding serial number and such data as its specifications and kind, are provided by a bar code. When each part is assembled on the vehicle, its serial number is read out. Further, when the operation of assembling each part, such as a bolt make-up operation or an engaging operation, is carried out in each step, information indicative of the result of operation, such as the make-up(tightening) torque value or state of engagement, is read out. In this embodiment of the manufacturing history management system, the serial number of each part and the state at the time of the assembling operation are taken out as operation data in this way, and the taken-out operation data is managed for each vehicle.

In the factory, a first to a third line are installed as the SRS assembling line described above. Each vehicle that is manufactured in the factory, is fed to either of these lines for the assembling of the SRS, if necessary.

Now, the structure of the manufacturing history management system will be described. Referring to FIG. 1, designated at FS1 to FS3 are file servers provided for the respective first to third lines. These file servers FS1 to FS3 have various files for storing information for controlling the operations carried out in each line or the operation data noted above.

Designated at CT1 and CT2 are communication terminals, which are connected via communication lines to an ALC (assembling line control) host computer HST which controls the entire vehicle production line. When data is transferred from the host computer HST, the two communication terminals both receive the data if they are operating normally. When it becomes necessary to transmit data from the manufacturing history management system to the host computer, both the communication terminals intend to transmit the data. However, the terminal which has first transmitted the data deletes the after-transmission data. Thus, one record of data is usually transmitted from one terminal. However, it takes a predetermined time to delete data by the terminal having first transmitted data, and therefore it is possible that the other terminal transmits the data before the deletion. The two communication terminals CT1 and CT2 are provided for duplexing the functions of communication. That is, it is meaningless to distinguish the two terminals from each other in describing the manufacturing history management system. Therefore, the communication terminals CT1 and CT2 are hereinafter generally referred to as communication terminal CTn. When a vehicle is fed to the SRS assembling line, AF-ON data, which is received data concerning the vehicle that is fed, is transmitted from the host computer HST. The communication terminal CTn receives the AF-ON data transmitted in this way. Further, when effecting the line-off of a vehicle from the SRS assembling line, history information about that vehicle in the SRS assembling line and AF-ON data concerning the judgment of the shipment, are transmitted from the communication terminal CTn to the host computer HST.

Operation terminals WT are each provided for each step of the line. In each pertinent step, each working terminal fulfills the following functions.

(1) Control of the operation to be carried out in the step in charge includes the identification of the arriving vehicle, judgment as to whether the operation is to be done, judgment of part capable of assembling, control of an ETC (electric torque control) wrench or constant torque wrench for the make-up operation, etc.

(2) Confirmation of the content of operation actually carried out in the step in charge—specifically the collection of the torque value in the make-up operation, state of engagement obtained by the engaging operation, serial number of the assembled part, etc.

(3) Formation of operation data according to the result of the above collection (4) Check as to whether the operation has been carried out in a status satisfying predetermined references and also display of the result of the check—Predetermined references are set according to operation table to be described later. This operation will be described later.

Management terminals Tn (n=1 to 3) are each provided for each of lines N for managing various files provided for each line. Specific contents of management will be described when describing the contents of each file. As other terminals provided for each line n, there are middle inspection terminals MIT, finish inspection terminals FIT, observation terminals OVT, maintenance terminals MET, booking terminals BT, adjustment terminals ADT and a re-inspection terminal RT. The roles of these terminals will be described, if necessary, when describing the contents of the individual files. Designated at N1 and N2 are token ring type networks, which are used as data transfer paths between terminal units in the manufacturing history management system.

Figure 2:
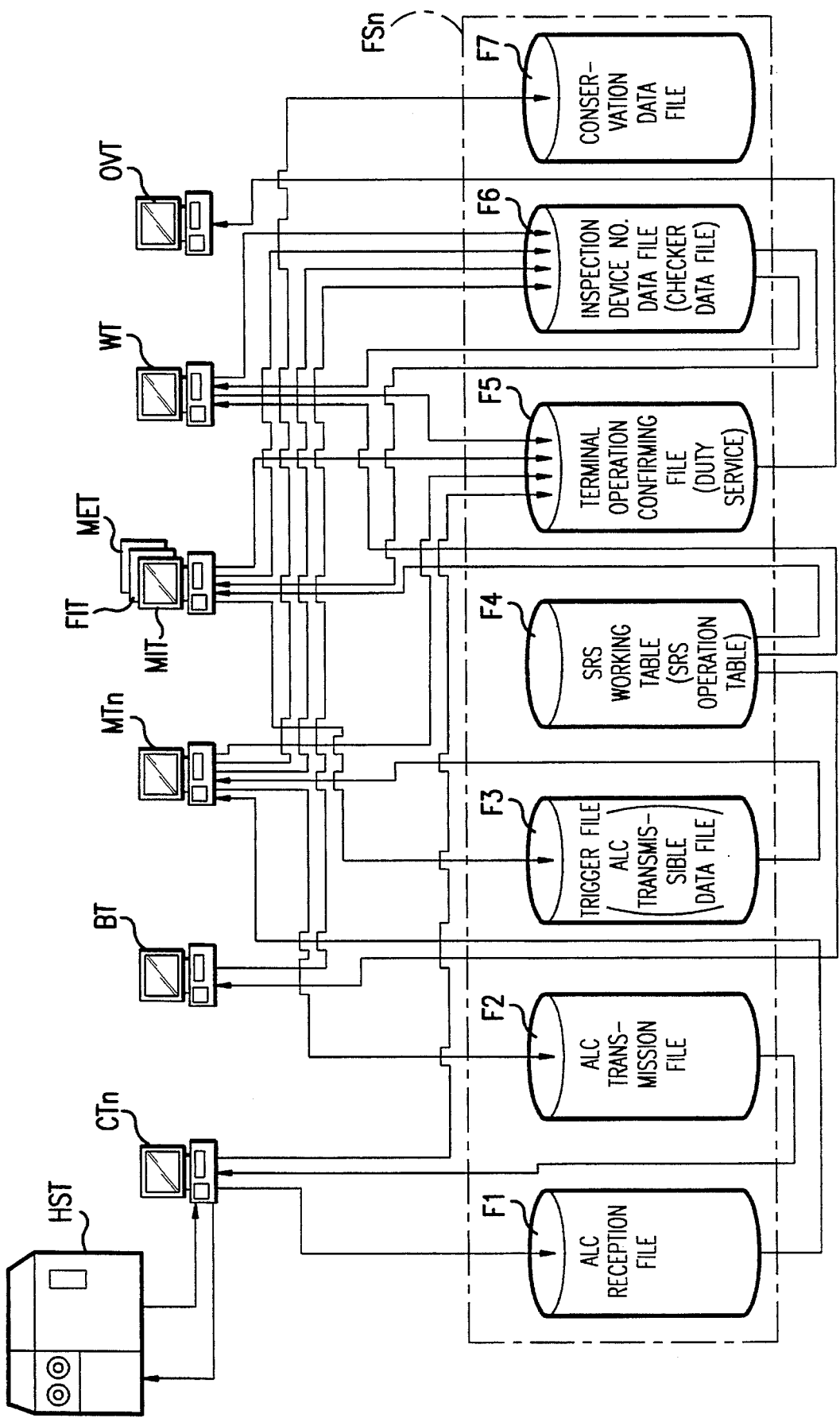
FIG. 2 is a view showing the relation between various management files and terminals dealing with these management files in the same embodiment.

The various files used in the manufacturing history management system will now be described. Each file server FSn (n=1 to 3), as shown in FIG. 2, has an ALC reception file F1, an ALC transmission file F2, a trigger file F3, a SRS operation table F4, a terminal duty service confirmation file F5, a checker data file F6 and a preservation data file F7 as management files for each line n. Now, the specific contents of these files and the roles of the terminals that deal with these files will be described.

(1) SRS operation table F4

Figure 3:
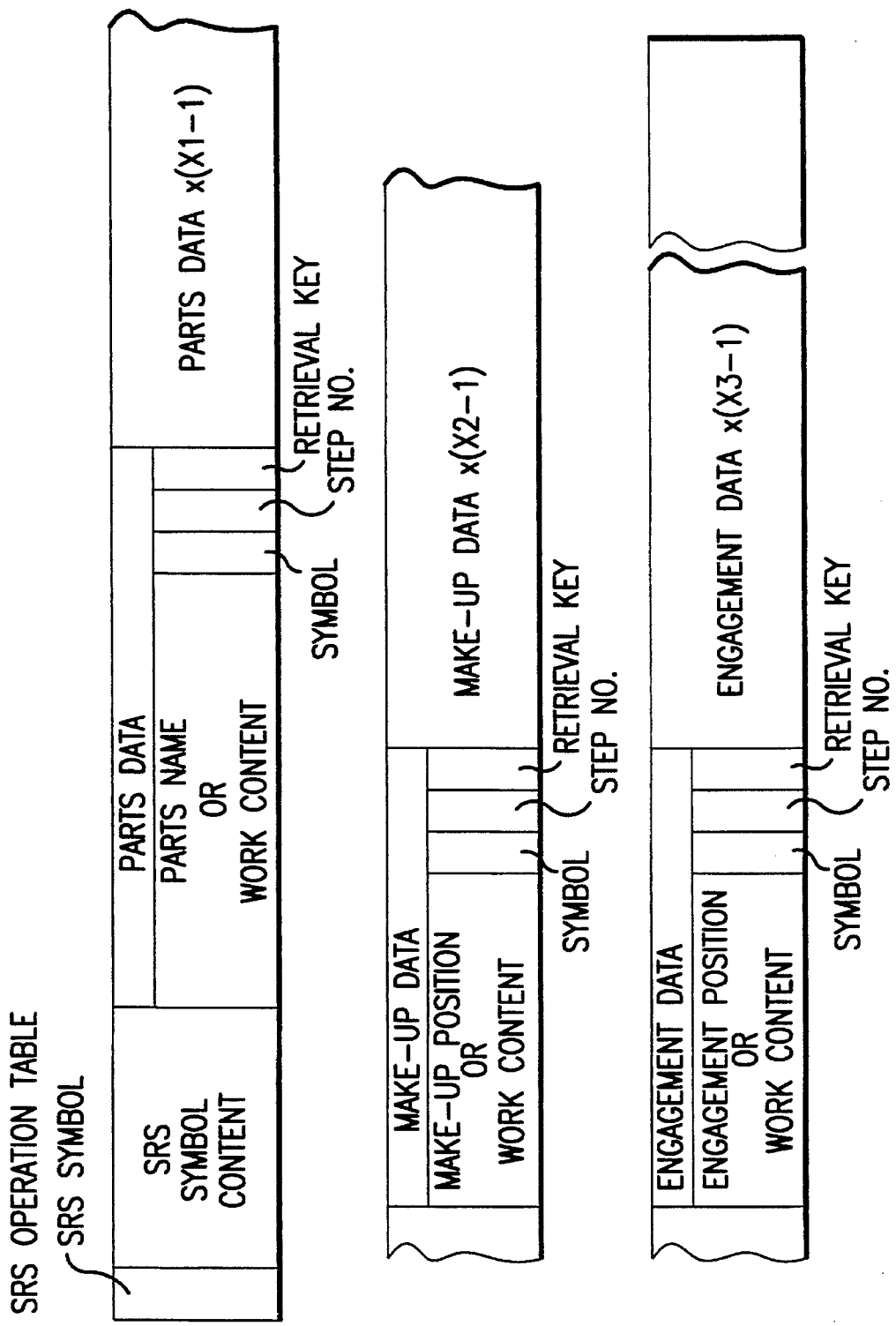
FIG. 3 is a view of a management file data format used in the same embodiment.

The SRS operation table F4 defines operation contents when assembling the SRS parts on the vehicle. As shown in FIG. 3, it has a SRS symbol, a SRS symbol content, parts table data, make-up table data and engagement data.

Of these data, the SRS symbol and SRS symbol content are pieces of descriptive information about the SRS mounted in the SRS assembling line.

The parts table data are for determining SRS parts for each SRS symbol. It is possible to define X1 parts at the most. If the number of the SRS parts is less than X1, only parts data corresponding to the parts are written in a parts table data fields, and in the remaining fields of the parts table data fields data which has no meaning as parts data (for instance space) is written. Each of the parts table data comprises data for designating the name to a part or the content of operation to be carried out on that part (such as make-up or engagement) to the operator, a symbol designating a part which is predetermined for each SRS symbol and capable of being assembled, the number of the step for carrying out the operation, and a retrieval key. The retrieval key is a piece of data written to provide for correspondence between the parts data and make-up or engagement data corresponding to the parts data.

The make-up data table is a piece of data defining the make-up operations necessary when assembling SRS parts. It is possible to define operations for X2 parts at the most. Each make-up table data comprises information defined for each SRS symbol and for designating make-up laces or contents of make-up operations, symbol showing a make-up torque range, the number of the step of the operation, and a retrieval key. The retrieval key here is defined in the make-up table data for providing correspondence between parts data and operation data (here make-up data) when these data are obtained with the operation of making up part. With make-up table data, in which the retrieval key of parts data concerning a certain part A is a and that part is to be mounted by make-up, the make-up value for that part is written such that it corresponds to make-up data in make-up table data in which the retrieval key is a. Where a plurality of make-up operations are to be executed for the same part, a plurality of pieces of make-up data having the same retrieval key as that of the parts data of that part are defined.

The engagement table data is a piece of data defining engagement operations necessary when assembling SRS parts on the vehicle. It is possible to define engagement operations for X3 parts at the most. Each of the engagement data is defined for each SRS symbol, and it comprises information designating engagement places or engagement operation contents, symbol, number of the step for carrying out the operation and a retrieval key. The retrieval key, like that in the make-up data, is for providing correspondence with parts data.

As for the make-up and engagement table data described above, like the parts table data, only those which are necessary are written in individual table data fields.

Each working terminal WT each time retrieves the parts data, make-up data and engagement data in the SRS operation table F4 with the step number of the step in charge as a key and takes out pertinent data. Of these data, the make-up and engagement data are used in each working terminal WT that has taken out the data for controlling the make-up and engagement operations in the pertinent step. When each working terminal WT takes the parts data, make-up data and engagement data, it memorizes the areas of the table F4 in which these data have been stored. The stored contents about these areas are referred to by the working terminal WT when forming operation data to be described later. Further, the table F4 is referred to by the management terminals MTn when forming preservation data concerning the vehicle that has been fed to the line.

(2) ALC reception file F1

Figure 4:
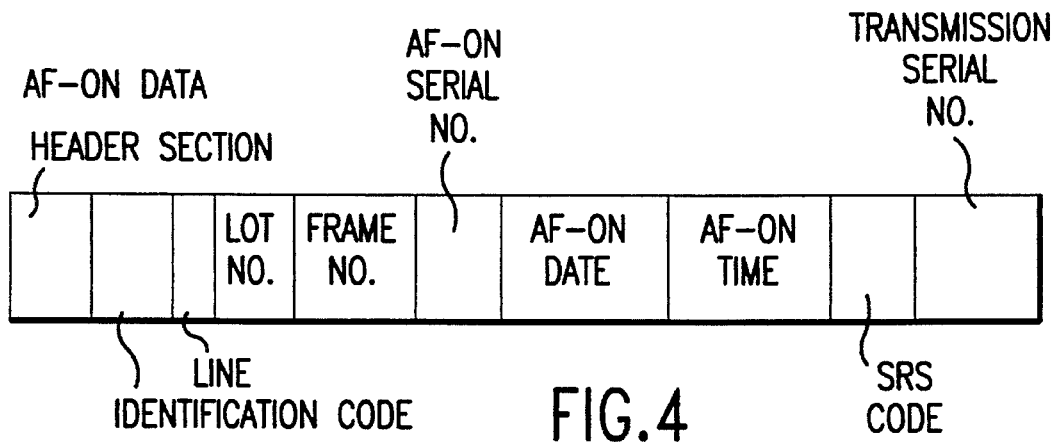
FIG. 4 is a view showing a management file data format used in the same embodiment.

In the ALC reception file F1, AF-ON data that has been received by each communication terminal CTn is written successively. These AF-ON data contains the information shown in FIG. 4. Of this information, the header is communication control data and comprises the destination of the AF-ON data (in this case the SRS assembling line) and source of the data (in this case the ALC host computer). The identification code has such content as to whether the vehicle corresponding to the pertinent AF-ON data is fed newly to the SRS assembling line or fed as vehicle returned to the factory. The handling of the pertinent vehicle in the SRS assembling line (such as new assembling, adjustment, etc. ) is determined according to the identification code. Immediately succeeding the identification code is the line number of the line, to which the vehicle is to be fed. Subsequent to this data is vehicle information such as lot number and frame number. The AF-ON data further contains information about its birth, such as frame number, AF-ON serial number and AF-ON date and time. Further, such information as, repair-in, repair-out, AF-OFF cancellation, returning to factory, AF-ON cancellation, returning to factory and cancellation, passing, etc., is received from the host computer HST and written in the ALC reception file.

(3) Checker data file F6

Figure 5:
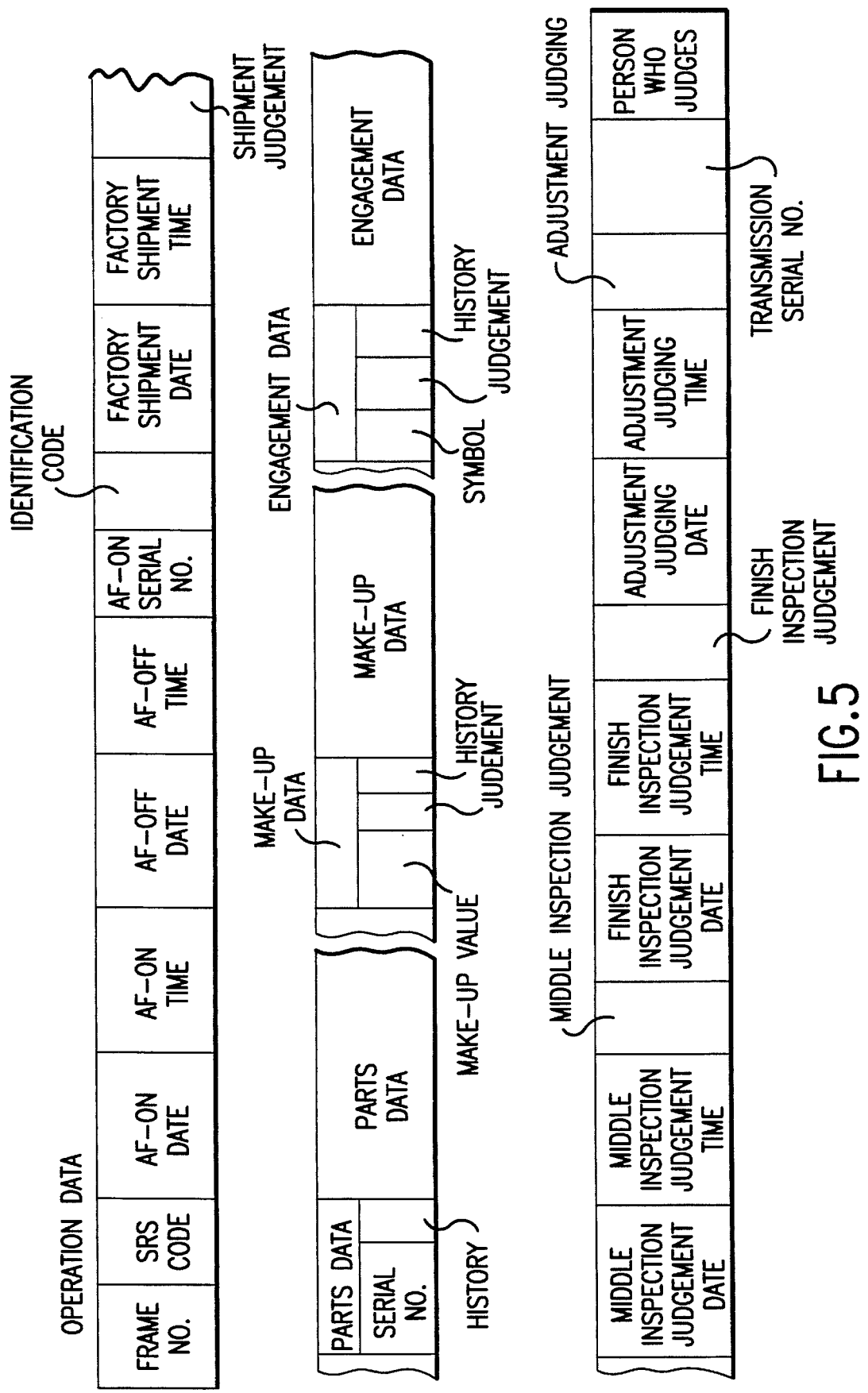
FIG. 5 is a view showing management file data format used in the same embodiment.

In the checker data file F6, operation data corresponding to each vehicle fed to the SRS assembling line is stored. The operation data is produced by the management terminals MTn whenever new AF-ON data is written in the ALC reception file F1. FIG. 5 shows the format of the operation data. As shown in the Figure, the operation data contains the contents of AF-ON data. It contains X1 pieces of parts data, X2 pieces of make-up data and X3 pieces of engagement data as items which are not in the AF-ON data. These items are secured to record the results of operations carried out on the vehicle, and at the time instant of their production by the management terminals MTn they are vacant and have no content. In these vacant spaces, the operation results (i.e., part number and make-up and engagement data) taken out by the working terminal WT are written successively. The operation data contains items corresponding to various check and adjustment steps, such as intermediate check data, completion check data and adjustment date. As for these items, data taken out in each step when the vehicle passes through the step is written. The written operation data includes data showing the terminal (adjustment terminal, operation terminal, etc.) that has written the operation results.

(4) ALC transmission file F2

Figure 6:
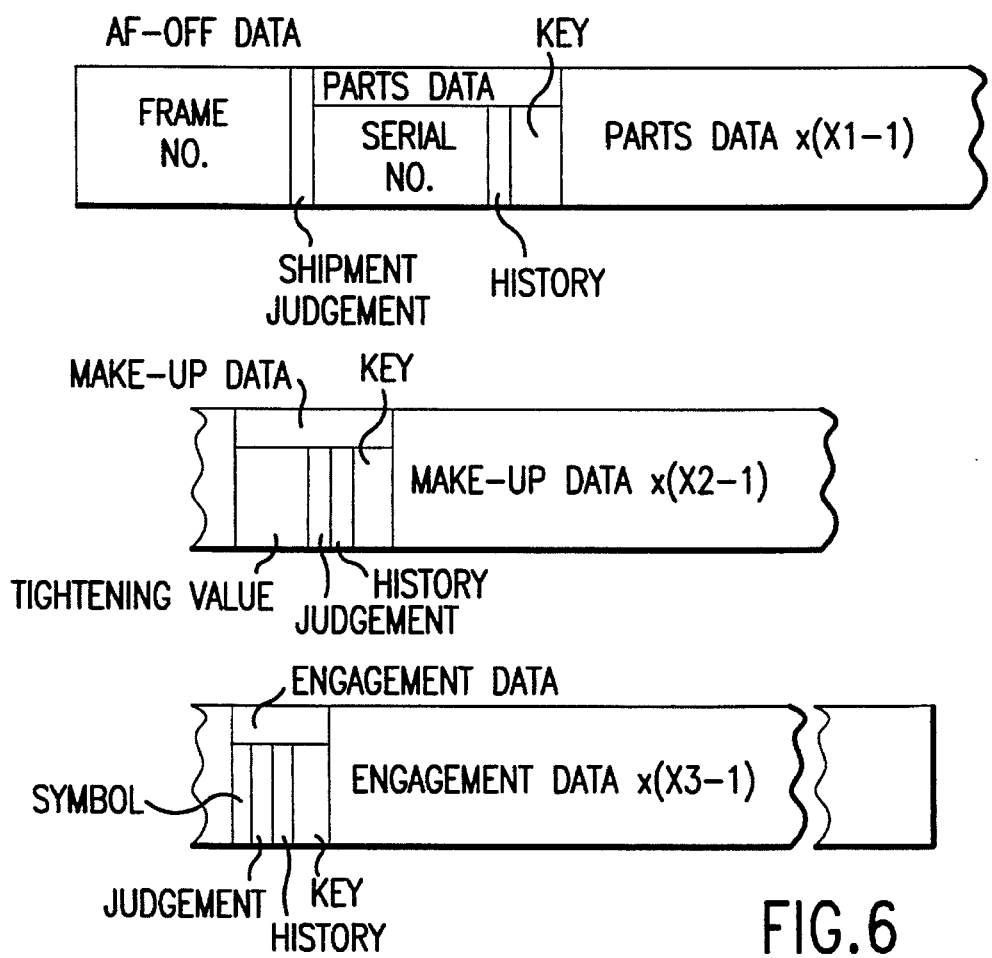
FIG. 6 is a view showing a management data format used in the same embodiment.

In the ALC transmission file F2, AF-OFF data as shown in FIG. 6 is written. The AF-OFF data are each formed by the management terminals MTn with respect to each vehicle after completion of the operations in the SRS assembling line. The AF-OFF data that are produced in the ALC transmission file F2 are successively transmitted from the communication terminals MTn to the host computer HST. Of the items contained in the AF-OFF data, the retrieval key (line number, series number and frame number), X1 pieces of parts data, X2 pieces of make-up data and X3 pieces of engagement data, are produced according to the contents of AF-ON data of the pertinent vehicle. However, unlike the AF-ON data, the parts data, make-up data and engagement data each have a key. The host computer HST receiving the AF-OFF data provides correspondence of individual data on the basis of these keys. Further, the AF-OFF data has a shipment judgment item. This item is written by finish inspection, adjustment, maintenance and re-inspection terminals FIT, ADT, MET and RT.

(5) Trigger file F3

Figure 7:
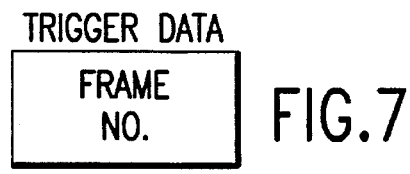
FIG. 7 is a view showing a management file data format used in the same embodiment.

In the trigger file F3, as shown in FIG. 7, the frame number of the vehicle, which permits the production and transmission of AF-OFF data, is written. The frame number is written by middle inspection, adjustment, finish inspection or maintenance and re-inspection terminals MIT, ADT, FIT or MET and RT. The management terminals MTn produce the above AF-OFF data with reference to the checker data file corresponding to the trigger data.

(6) Preservation data file F7

Figure 8:
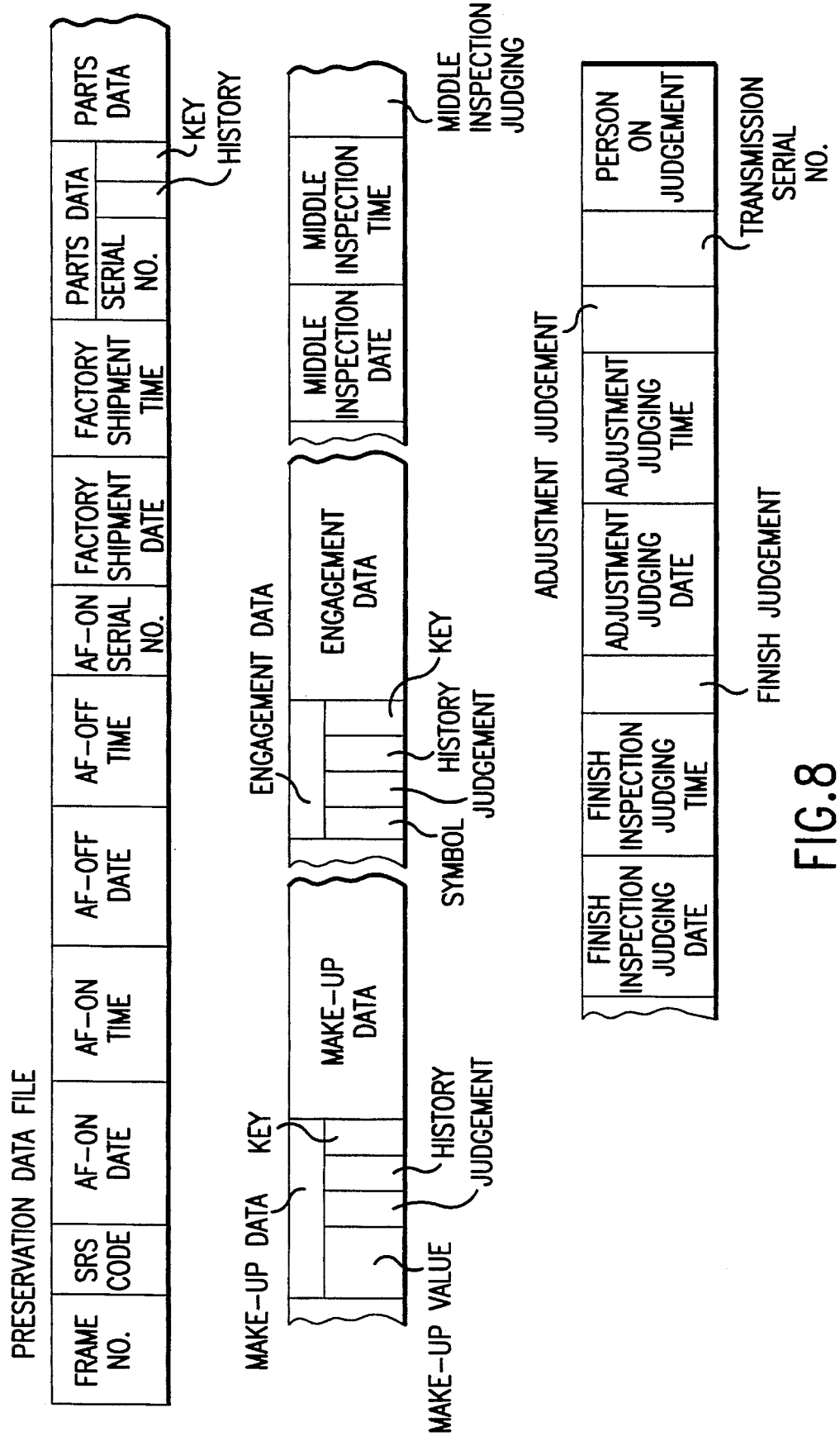
FIG. 8 is a view showing a management file data format used in the same embodiment.

In the preservation data file F7, preservation data as shown in FIG. 8 is stored. The preservation data has a purpose of preserving the manufacturing history of each vehicle, on which the operations in the SRS assembling line have been completed, as a record. As shown in FIG. 8, the preservation data is substantially of the same content as the operation data. However, unlike the operation data, the parts data, make-up data and engagement data in the preservation data each have a key. These keys permit readily grasping the relation between the parts used for the shipped vehicle and the contents of operations carried out with respect to these parts. Further, the preservation data is used when the vehicle is returned to the factory when a deficiency of the vehicle being transported is found.

In such a case, the vehicle which has returned to the factory is fed to a repair step. In this step, the bar code on the vehicle is read out, and data of the vehicle that has been in the preservation file is transferred to the operation file. Then, the vehicle is repaired, and repair data is written in the operation file. Then, a shipment judgment is done, and the vehicle is shipped, while preservation data is produced once again.

(7) Terminal duty service confirmation file F5

The terminal duty service confirmation file F5 is provided for grasping the status of duty service of each terminal in the system. Each terminal writes the prevailing time instant periodically (for instance at an interval of 5 minutes) in the file F5. The time instants written in the file F5 are read out by the observation terminal OVT. If the read-out time instants are normal, the observation terminal displays that the pertinent terminal is in duty service. If the observation terminal OVT finds as a result of comparison between these time instants and those of its own that there is a difference in excess of a predetermined time, it displays that the pertinent terminal is inoperative.

Now, the operation of the manufacturing history management system will be described.

1. System initialization

When the power source closure and initialization are done in each SRS assembling line terminal, the manufacturing history management system becomes ready for operation. When the working terminal WT has been initialized, it accesses the operations table F4 via a file server FSn to read out data corresponding to the step in charge of it in the parts data, make-up data or engagement data in the table. The working terminal WT for each step controls the make-up or engagement operation in the step according to the read-out make-up or engagement data. Further, when the working terminal WT reads out data from the operation table, it memorizes the orders in the parts data, make-up data and engagement data in each piece of data. When the working terminal WT subsequently takes out the serial number of part, the result of the make-up torque measurement or the state of engagement, the writing positions of these take-out results in the operation data are determined according to the orders that were memorized at the time of the read-out noted above. For example, when the working terminal WT for a certain step reads out parts data of the third part in the operation table F4, the working terminal WT subsequently assembles the serial number taken out from the part as parts data of the third part in the operation data. Like operation is performed with the make-up and engagement data.

2. AF-ON data reception

When a vehicle is fed to the SRS assembling line, AF-ON data concerning the vehicle is transmitted from the host computer HST to the communication terminals MTn. When the communication terminal CTn receives the AF-ON data, it judges the line number in the data and sends the AF-ON data to the file server corresponding to the line number among the file servers FSn (n=1 to 3). As a result, the received AF-ON data is written in the ALC reception file F1 held in that file server.

3. Production of operation data

The management terminals MTn, meanwhile, are repeatedly executing at all times a check as to whether there is new data in the ALC reception file F1. When they find new AF-ON data, they produce operation data having the contents of the AF-ON data and those of the operation table (see FIG. 5) in the checker data file F6.

4. Issuance of manufacturing history management table

After the host computer HST transmits the AF-ON data to the manufacturing history management system, it issues a manufacturing history table about the vehicle to be fed to the SRS assembling line. On this manufacturing history table, the frame number of the vehicle to be fed to the SRS assembling line and a bar code representing a model series code are printed. The bar code is also printed on an assembling specification. The manufacturing history table issued by the host computer HST is fed to the pertinent vehicle.

5. Processing in each operation step

Vehicle is conveyed on a conveyer to be fed to successive step stations in the SRS assembling line. In each step, a process to be described later is executed whenever the vehicle arrives. First, when the vehicle arrives at the front of the working terminal WT, the bar code of the assembling specification is scanned by a bar code reader to read out the frame number and model series code, as represented by the bar code. When the assembling specification is broken, the bar code on the manufacturing history table in the vehicle is read out. The frame number and model series code that have been read out in this way, are displayed on a display screen in the working terminal. The working terminal WT then retrieves operation data in the checker data file F6 with the line number and also the frame number and model series code read out by the bar code reader as a key. Then, according to the result of the retrieval, it reads out operation table data corresponding to the SRS symbol of the operation data and judges whether SRS parts are to be assembled on the vehicle.

In either of the following cases (a) to (d), a judgment is done that no SRS part is to be assembled in that step.

(a) When the arrived vehicle is not the subject of the SRS assembling.

(b) When there is no operation to be carried out on the arrived vehicle in the pertinent step, although the vehicle is the subject of the SRS assembling.

(c) When the bar code in the manufacturing history table of the arrived vehicle could not have been normally read out.

(d) When proper AF-ON data is not supplied from the host computer HST.

In the above cases, an abnormality message indicative of the pertinent case is displayed on the display screen of the working terminal. If the abnormality message is displayed due to failure of normal reading of the model series code, the operator can re-execute the reading of the bar code. If the re-execution is not done, the vehicle is fed to the next step without execution of any operation in the pertinent step. The working terminal WT then waits until a new bar code of the vehicle is read out.

If the arrived vehicle is a SRS specification vehicle and is requiring operation in the pertinent step, operation data corresponding to the line number and also the frame number and model series code that have been read out by the bar code reader, is read out from the checker data file F6 and written in an operation data storage area in a memory provided in the working terminal WT. The contents of the written operation data are displayed on the display screen of the working terminal WT. Then, the operation that is specified for the pertinent step is carried out. Individual steps will now be described in detail.

(1) Steps of assembling dash sensors R and L

The contents of operations in these steps will now be described by taking the step of assembling the dash sensor R as an example.

a. The bar code representing the serial number of the dash sensor R and the specification, kind, etc. of the part is read out with the bar code reader.

b. The dash sensor R is assembled on the vehicle, and it is secured thereto by inserting bolts in predetermined places and making up these bolts with an ETC (electric torque control) wrench.

c. The make-up of the bolts is confirmed with a constant torque wrench.

The step of assembling the dash sensor L is executed as a similar operation.

(2) Processing of working terminal in each above step

The serial number of the dash sensor R is input to the working terminal WT. In addition, the make-up torque value provided by the ETC wrench and the result of confirmation of the make-up torque value with the constant torque sensor (either passed or failed) are determined by the sensors of the respective wrenches, and the results are input to the working terminal WT. Then, a check is done as to whether the individual torque measurement results are in a predetermined permissible range. The result of the check is displayed in the working terminal. The working terminal WT then does a check as to whether the dash sensor is to be assembled in that step by referring to the parts data area corresponding to the step in the operation data storage area. If the result of the check is "Yes", it writes the serial number of the dash sensor R. Further, it writes the individual torque measurement results in a make-up data area corresponding to each make-up operation in the step in the operation data storage area.

(3) Step of checking engagement between sensor and unit a. The bar code of the serial number of the SRS unit is read out with the bar code reader.

b. The state of engagement between the dash sensor SRS unit connectors with an engagement mouth. The dash sensor and SRS unit connectors have their engagement portions formed with through holes, and when the two are normally engaged, a predetermined bar code is completed. The bar code which is formed in this way is optically read out by the engagement mouth, and in this way, a check is done as to whether the state of engagement is normal.

(4) Processing of working terminal in above step

The data that is read out by the engagement mouth is sent to a half engagement checker, which supplies information as to whether the engagement state is passed or failed to the working terminal. At the same time, information about the kind of the engagement connector and also information about the kind of failure, are sent to the working terminal. Whether the engagement state is normal is displayed on the working terminal. Then, the working terminal WT reads out the operation table data and checks whether the connectors for which the engagement state has been judged are those which have to be checked in the step. If the result of the check is "Yes", the serial number of the SRS unit is written in the parts data area corresponding to the step in the operation data storage area. Further, the result of check of the engagement state is written in the engagement data area corresponding to the engagement operation in the pertinent step in the operation data storage area. If the connectors having been engagement checked are not intended connectors, a decision of failure is given even if the engagement state may be normal.

In addition to the steps described above, the following steps are executed, and mounting of necessary SRS parts on the vehicle and necessary engagement checks are done.

When all the operations in the pertinent step are completed in the above way, the working terminal WT writes the operation data, with which the operation contents have been written, in the checker data file F6. The writing of the operation data is done for each vehicle. If the operation data is changed by a different terminal before completion of all the operations, the working terminal reads the updated operation data and returns it together with added prevailing operation contents to the checker data file F6. If data change has been done by a different terminal when data is to be written by the working terminal, the above process is repeatedly executed at most N times (designated number of times) until normal data writing is obtained. If normal data writing can not be obtained by the execution of the process for N times, an NG message is displayed on the display screen, and then processing with the next vehicle is carried out. The permissible number of times of data writing is set to N in order to prevent the data writing for one vehicle from being prolonged to cause interruption of the processing with respect to the succeeding vehicles for long time. When the vehicle has passed all the steps necessary for the SRS assembling, the writing of the parts data, make-up data and engagement data constituting the operation data of the pertinent vehicle is completed.

6. Middle inspection

The vehicle after the assembling of SRS parts through respective steps, is then conveyed to a middle inspection step to arrive at the front of the middle inspection terminal MIT in the step. Then, the manufacturing history table is taken out from the vehicle, and the bar code representing the line number, frame number and model series code is read out by the bar code reader. The manufacturing history table is then set by the operator in a printer in the middle inspection terminal MIT. In the middle inspection terminal MIT, operation data that is coincident with the line number, frame number and model series code that have been read out by the bar code reader is retrieved from among the operation data in the checker data file. The operation data obtained through the retrieval is displayed.

The operator confirms the manufacturing history table and the middle inspection terminal display screen and makes an overall judgment as to whether the operations have been normally completed. As a result, information indicative of "inspection passage (shipment O.K.)" is written by the middle inspection terminal MIT as an item of middle inspection judgment of the pertinent operation data in the checker data frame F6. If failure results in the overall judgment, information indicative of "inspection failure (shipment not O.K.)" is written by the middle inspection terminal MIT as an item of middle inspection judgment of the pertinent operation data in the checker data file F6. Then, the operator sets the manufacturing history table in the middle inspection terminal printer and, when a print instruction is given, prints the operation data in the manufacturing history table. In this way, the middle inspection is completed. The middle inspection terminal MIT writes the line number of the pertinent line and the frame number of the vehicle after the middle inspection in the trigger file F3.

7. ALC transmission

The management terminals MTn are monitoring the trigger file F3 at all times. If a new frame number is found, the management terminals MTn retrieve the checker data file F6 with that frame number as a key. Then, they produce AF-OFF data by adding, to the read-out operation data, a key for providing correspondence among the parts data, make-up data and engagement data. Then they write the AF-OFF data in the ALC transmission file F2 and delete the trigger data. Meanwhile, the communication terminals CTn are monitoring the ALC transmission file F2 at all times, and when they find new AF-OFF data, they send the data to the host computer HST. After completion of the AF-OFF data transmission, they delete the AF-OFF data.

If an error is generated in the AF-OFF data writing process during the ALC transmission process, the writing process is repeatedly executed until a normal writing process is obtained. If normal writing can not be obtained by repeatedly executing the writing for a designated number of times, the management terminals MTn produce the AF-OFF data in a hard disk provided in themselves and delete the AF-OFF data in the ALC transmission file.

8. Finish inspection

The vehicle which has passed the middle inspection is fed to the finish inspection step to arrive at the front of the finish inspection terminal FIT in the step. The operator causes reading of the bar code in the manufacturing history table and causes display of the operation data on the finish inspection terminal display screen an overall judgment as to whether the vehicle is complete. If any deficiency is found as a result of the inspection, information indicative of "failure" is written as an item of finish inspection judgment of the pertinent operation data. After the finish inspection, the finish inspection terminal FIT writes the adjustment end time in the "finish inspection judgment date" and "finish inspection judgment time" of the operation data as shown in FIG. 5. When an deficiency is found with the vehicle, the adjustment terminal MET writes the adjustment end time in the "adjustment judgment date" and "adjustment judgment time" in the operation data shown in FIG. 5. From the results of the inspection and adjustment, a shipment judgment is done, and if the judgment is passed, this is written in the operation file. Then, the frame number is written in the trigger file and transmitted to the host computer.

9. Preservation data production

The host computer HST makes a judgment according to AF-OFF data transmitted from the communication terminal CTn as to whether it is O.K. to ship the vehicle. If shipment O.K. judgment is made, the checker data file F6 is retrieved according to the frame number, and the operation data of the vehicle judged to be shipment O.K. is read out. The management terminal MTn adds a key to parts data, make-up data and engagement data in the read-out operation data and writes the prevailing time in the "factory shipment date" and "factory shipment time" in the preservation data shown in FIG. 8. Thus, preservation data is formed, which is written in the preservation data file F7. After the preservation data has been written, the operation data and AF-ON data of the vehicle are deleted from the checker data file F6 and ALC reception file F1. Since data corresponding to the vehicle is automatically deleted from the management file with the shipment of the vehicle, the management file may have less capacity. Further, by reducing the capacity of the management file, it is possible to enhance the response speed when accessing the file, thus improving the system efficiency. Particularly, the checker data file F6 is required to have high response speed for it is accessed by each operation terminal WT. However, since data of the shipped vehicle is automatically deleted from the checker data file F6 as noted above, the operation terminal WT can quickly retrieve and rewrite the operation data.

As has been described in the foregoing, according to the invention the management terminal manages the transfer of data among the individual files, and the operation terminals, etc. in the individual manufacturing steps need only to write data in files. It is thus possible to efficiently manage the manufacturing history without increasing the burden on the side of the terminals in the system. Further, since the management terminal causes the data transfer among the files and deletes unnecessary data, it is possible, in addition to the above effects, to prevent the waste that the same data is present in a plurality of files, thus permitting effective utility of the system resources. Further, by the provision of keywords for relating the individual table data of the files to one another, it is possible to quickly retrieve data in connection with the take-out and management of manufacturing history data.

What is claimed is:

1. A manufacturing history management system for manufacturing vehicles, which comprises operation control means provided for each manufacturing step in a production line comprising a plurality of manufacturing steps, said operation control means including part identifying means for identifying a part to be assembled conveyed along said production line and operation detection means for producing the result of operation performed on said part in each step, and memory means for preserving the result of operation output in each said manufacturing step, wherein said memory means includes:

a file for transmitting and receiving data about said part assembled in said production line;

an operation data file corresponding to each said operation control means and possessing operation data corresponding to said part;

a checker data file, in which a result of operation performed according to operation data in said operation data file is written from said operation detection means through said operation control means; and a preservation file for preserving the data in said checker data file after completion of execution of all the steps in said production line;

said manufacturing history management system further comprising management means for controlling data transfer among said individual files in said memory means; and display means for displaying manufacturing history management data sent out from a host computer on a display screen.

2. The manufacturing history management system according to claim 1, wherein when normal movement from a source to a destination through the individual files in said memory means is completed, the data in said source is deleted by said management means.

3. The manufacturing history management system according to 1 or 2, wherein a keyword is provided for relating individual table data in said individual files in said memory means.

4. A manufacturing history management system for manufacturing vehicles on a production line comprising a plurality of manufacturing steps, said manufacturing history management system comprising:

operation control means provided for each of said manufacturing step, said operation control means including:

part identifying means for identifying a part to be assembled on said production line and operation detection means for producing the result of an operation performed on said part in each of said step;

said manufacturing history management system further comprising:

a host computer for managing and controlling each of said operation control means;

memory means for preserving said result of said operation in each of said manufacturing step; wherein said memory means includes:

a file for transmitting and receiving data about said part assembled in said production line;

an operation data file corresponding to each said operation control means and possessing operation data corresponding to said part;

a checker data file, in which a result of operation performed according to operation data in said operation data file is written from said operation detection means through said operation control means; and a preservation file for preserving the data in said checker data file after completion of execution of all the steps in said production line; and wherein said manufacturing history management system further comprises:

management means for controlling data transfer among said individual files in said memory means, wherein said management means is separate from said host computer; and display means for displaying manufacturing history management data sent out from said host computer on a display screen.

5. The manufacturing history management system of claim 4, wherein when normal movement from a source to a destination through the individual files in said memory means is completed, the data in said source is deleted by said management means.

6. The manufacturing history management system of claim 5, wherein a keyword is provided for relating individual table data in said individual files in said memory means.

* * * * *